United States Patent
Steiner

(10) Patent No.: US 10,792,604 B2
(45) Date of Patent: Oct. 6, 2020

(54) HORIZONTAL COALESCING FILTER

(71) Applicant: TM Industrial Supply, Inc., Erie, PA (US)

(72) Inventor: Carl A. Steiner, Erie, PA (US)

(73) Assignee: TM Industrial Supply, Inc., Erie, PA (US)

(*) Notice: Subject to any disclaimer, the term of this patent is extended or adjusted under 35 U.S.C. 154(b) by 897 days.

(21) Appl. No.: 15/191,572

(22) Filed: Jun. 24, 2016

(65) Prior Publication Data

US 2016/0375390 A1     Dec. 29, 2016

Related U.S. Application Data

(60) Provisional application No. 62/184,317, filed on Jun. 25, 2015.

(51) Int. Cl.

| | |
|---|---|
| *B01D 46/00* | (2006.01) |
| *B01D 45/16* | (2006.01) |
| *B01D 46/52* | (2006.01) |
| *B01D 50/00* | (2006.01) |

(52) U.S. Cl.
CPC .......... *B01D 46/003* (2013.01); *B01D 45/16* (2013.01); *B01D 46/521* (2013.01); *B01D 50/002* (2013.01)

(58) Field of Classification Search
None
See application file for complete search history.

(56) References Cited

U.S. PATENT DOCUMENTS

| | | | | |
|---|---|---|---|---|
| 1,923,598 | A * | 8/1933 | Walker | B01D 19/0042 |
| | | | | 95/158 |
| 1,952,281 | A * | 3/1934 | Ranque | F25B 9/04 |
| | | | | 126/247 |
| 3,010,537 | A * | 11/1961 | Baker | B01D 46/10 |
| | | | | 55/323 |
| 3,364,658 | A * | 1/1968 | Walker | B01D 17/10 |
| | | | | 210/114 |

(Continued)

FOREIGN PATENT DOCUMENTS

CA     2426752 A1     10/2003

OTHER PUBLICATIONS

Dragon Products LTD "Non-Heated Production Separators", Apr. 15, 2019, pp. 2-3 https://web.archive.org/web/20190415121714/https://dragonproductsltd.com/production-separators-2/ (Year: 2019).*

*Primary Examiner* — Christopher P Jones
*Assistant Examiner* — Brit E. Anbacht
(74) *Attorney, Agent, or Firm* — The Webb Law Firm

(57) ABSTRACT

A horizontal gas coalescing filter unit having a reduced vertical footprint includes a first housing including an inlet and an outlet, the inlet being configured for receiving a gas, including liquid condensates, under pressure. The filter unit includes an impingement head, a tuyere, and a vane separator to cause liquid condensates to separate from the gas. A second housing is positioned in fluid communication with the horizontal housing and contains a coalescing filter for receiving the gas exiting the vane separator and for further removing the liquid condensates from the gas. A gas outlet is associated with the second housing for allowing the separated, dry gas to exit the filter unit. A method for separating liquid condensates from the gas is also provided.

12 Claims, 6 Drawing Sheets

(56) References Cited

U.S. PATENT DOCUMENTS

| | | | | |
|---|---|---|---|---|
| 3,618,980 A * | 11/1971 | Leising | B60R 21/261 | 280/736 |
| 4,187,088 A * | 2/1980 | Hodgson | B01D 45/16 | 55/459.4 |
| 4,187,089 A * | 2/1980 | Hodgson | B01D 45/16 | 55/396 |
| 5,282,881 A * | 2/1994 | Baldock | C22B 5/10 | 75/500 |
| 5,510,017 A * | 4/1996 | Abdullayev | B01D 45/16 | 210/512.1 |
| 6,080,228 A * | 6/2000 | Okada | B01D 46/0012 | 55/396 |
| 6,083,291 A * | 7/2000 | Okada | B01D 45/12 | 55/337 |
| 6,168,647 B1 * | 1/2001 | Perry, Jr. | B01D 45/02 | 55/319 |
| 6,190,438 B1 * | 2/2001 | Parks | B01D 45/16 | 162/189 |
| 6,350,299 B1 * | 2/2002 | Dekker | B01D 19/0047 | 55/320 |
| 7,332,010 B2 | 2/2008 | Steiner | | |
| 7,503,950 B2 | 3/2009 | Håland | | |
| 7,833,298 B2 * | 11/2010 | Larnholm | B01D 45/12 | 55/318 |
| 7,850,751 B2 | 12/2010 | Steiner | | |
| 8,066,844 B2 * | 11/2011 | Duesel, Jr. | B01D 1/14 | 159/16.2 |
| 8,721,771 B2 * | 5/2014 | Duesel, Jr. | B01D 1/14 | 110/203 |
| 8,741,100 B2 * | 6/2014 | Duesel, Jr. | B01D 1/14 | 159/4.01 |
| 8,790,496 B2 * | 7/2014 | Duesel, Jr. | B01D 1/14 | 203/12 |
| 8,801,897 B2 * | 8/2014 | Duesel, Jr. | B01D 1/14 | 159/47.3 |
| 9,005,328 B2 * | 4/2015 | Steiner | B01D 46/0058 | 55/498 |
| 9,192,884 B2 | 11/2015 | Steiner et al. | | |
| 9,199,861 B2 * | 12/2015 | Duesel, Jr. | C02F 1/048 | |
| 9,296,624 B2 * | 3/2016 | Duesel, Jr. | B01D 1/0058 | |
| 10,005,678 B2 * | 6/2018 | Duesel, Jr. | C02F 1/042 | |
| 2003/0115843 A1 * | 6/2003 | Haland | B01D 45/16 | 55/392 |
| 2003/0150324 A1 * | 8/2003 | West | B01D 17/0211 | 95/268 |
| 2004/0065110 A1 * | 4/2004 | Barratt | B01D 45/06 | 62/471 |
| 2007/0044437 A1 * | 3/2007 | Larnholm | B01D 45/16 | 55/319 |
| 2008/0168753 A1 * | 7/2008 | Christiansen | B01D 45/16 | 55/440 |
| 2008/0290532 A1 * | 11/2008 | Kooijman | B01D 1/305 | 261/108 |
| 2012/0210688 A1 * | 8/2012 | Burns | B01D 46/0024 | 55/483 |
| 2013/0139689 A1 * | 6/2013 | Schook | B01D 45/02 | 95/271 |
| 2015/0041071 A1 * | 2/2015 | Zimmer | B01D 3/06 | 159/26.1 |
| 2016/0375389 A1 * | 12/2016 | Steiner | B01D 46/003 | 95/268 |

\* cited by examiner

HORIZONTAL COALESCING FILTER

CROSS REFERENCE TO RELATED APPLICATIONS

This application claims priority to provisional U.S. application Ser. No. 62/184,317, filed Jun. 25, 2015, entitled "Horizontal Coalescing Filter", the disclosure of which is incorporated herein by reference in its entirety.

BACKGROUND OF THE INVENTION

Field of the Invention

The present invention is directed to a separator for gas under pressure, and more particularly to a horizontal gas coalescing filter.

Description of Related Art

During fracking, such as in the Marcellus/Utica Shale industry, wet gas exiting the well head is often fed into one or more gas coalescing filters to separate the gas from the liquid condensates or natural gas liquids (NGLs). These liquid condensates can include hydrocarbons, such as ethane ($C_2H_6$) and/or water. Coalescing is the process where liquid aerosols in a compressed gas/air system are forced to join together into large droplets. These combined droplets then can be drained away by gravity. These gas coalescing filters are typically positioned in such a manner as to have one positioned above another, however, a drawback to this arrangement is that the liquids drop down onto the gas coalescing filters positioned below.

Another type of coalescer includes a 2-phase or 3-phase deliquidizer coalescer which is vertically oriented. In these types of coalescers, the wet gas enters into a vertical tower that houses at least one vane separator and a coalescing filter element. The vane separator can remove all liquids down to approximately 10 microns. The almost dry gas then moves into the gas coalescing chamber where it is supplied through the coalescing filter element through a pleated filter element. One example of a high pressure filter/separator gas chamber is disclosed in U.S. Pat. No. 7,332,010, owned by TM Industrial Supply, Inc., the assignees of the present invention, the entirety of which is hereby incorporated in the present application. The high-pressure filter/separator utilizes Gas Flow Membrane Technology (GFM Technology®) which employs a reverse flow design through a multi-stage filtration vessel utilizing amount-to-in flow through a pleated filter.

While the 2-phase or 3-phase vertically oriented deliquidizer coalescer is extremely efficient in terms of removal of the liquid condensates from the gas, the coalescer unit can be very tall, requiring large vertical space requirements for housing the coalescer unit. Thus, a need exists which combines the efficiency of the vertically oriented coalescer while reducing the overall height requirements for the filter unit and, thus, reducing its vertical footprint.

SUMMARY OF THE INVENTION

In accordance with one aspect, the present disclosure is directed to a horizontal gas coalescing filter unit for separating liquid condensates from a gas wherein the filter unit has a reduced overall height requirement and a reduced vertical footprint. The gas coalescing filter unit comprises a first housing positioned in a first orientation, such as a substantially horizontal orientation. The first housing including an inlet and an outlet. The inlet is configured for receiving a gas under pressure wherein the gas includes the liquid condensates. The filter unit can include an impingement head and a tuyere located within the first housing. The impingement head changes the flow direction of the gas and the tuyere forces the gas outwardly in a centrifugal manner. The filter unit can also include a vane separator located within the first housing and positioned inline with the inlet and the impingement head. The vane separator can include wall portions defining a tortuous path through which the gas flows. The vane separator is configured for removing the liquid condensates from the gas. A reservoir can be provided in fluid communication with the first housing for receiving the separated liquid condensates. A second housing is in fluid communication with the first housing. The second housing is positioned in a second orientation that is different than the first orientation of the first housing, such as in a substantially vertical orientation. A coalescing filter is located within the second housing for receiving the gas exiting the vane separator and for further removing the liquid condensates from the gas. According to one embodiment, the coalescing filter can include a pleated filter and the coalescing filter can be configured to cause the gas to flow from an exterior of the pleated filter to a hollow interior of the pleated filter. According to this design, any liquid condensates separated out of the gas by the pleated filter flow out of a bottom portion of the vertical coalescing filter. A gas outlet is associated with the second housing for allowing the separated gas to exit the filter unit. According to one embodiment, the filter unit can have an overall height of approximately 72" or less, however, it can be appreciated that some units can have an overall height that exceeds 72". According to some designs, a lower portion of the coalescing filter can be contained within the first housing.

In accordance with another aspect of the invention, a method for filtering liquid condensates from a gas under pressure includes providing a horizontal gas coalescing filter unit having a first or horizontally oriented housing including an inlet and an outlet, the inlet being configured for receiving the gas under pressure; a vane separator located within the horizontal housing and positioned inline with the inlet, the vane separator being configured for removing the liquid condensates from the gas; a second or vertically oriented housing in fluid communication with the first housing, at least one vertical coalescing filter located within the second housing for receiving the gas exiting the vane separator and for further removing the liquid condensates from the gas; and a gas outlet associated with the second housing for allowing the separated gas to exit the filter unit. The method further includes supplying the gas under pressure into the inlet of the first housing and collecting the separated gas from the gas outlet associated with the second housing. The vane separator includes wall portions defining a tortuous path through which the gas flows. The filter unit includes a reservoir in fluid communication with the first housing for receiving the separated liquid condensates. The filter unit can also include an impingement head within the first housing positioned inline between the inlet and the vane separator. The filter unit can also include a tuyere located between the impingement head and the vane separator. The tuyere can be configured for forcing the gas outwardly in a centrifugal direction. The coalescing filter located within the second housing can include a pleated filter and the coalescing filter can be configured to cause the gas to flow from an exterior of the pleated filter to a hollow interior of the pleated filter so that any liquid condensates separated out of the gas by the pleated filter flow out of a bottom portion of the coalescing filter. According to one embodiment, the filter unit can be designed to have an overall height of approximately 72" or less and a lower portion of the coalescing filter is contained within the first housing. According to an embodiment, the first orientation of the first housing can be substantially horizontal and the second orientation of the second housing can be substantially vertical.

In accordance with another aspect of the invention, a horizontal gas coalescing filter unit comprises a first housing including an inlet and an outlet. The first housing being positioned in a first orientation. The inlet is configured for receiving a gas under pressure wherein the gas includes liquid. The filter unit further includes a vane separator located within the first housing and positioned inline with the inlet. The vane separator is configured for removing liquid condensates from the gas. The filter unit further includes a reservoir in fluid communication with the first housing for receiving the separated liquid condensates and a second housing in fluid communication with the first housing. The second housing is positioned in a second orientation that is different from the first orientation of the first housing. The coalescing filter is located within the second housing for receiving the gas exiting the vane separator and for further removing the liquid condensates from the gas. The coalescing filter comprises a pleated filter and the coalescing filter is configured to cause the gas to flow from an exterior of the pleated filter to a hollow interior of the pleated filter wherein the liquid condensates exit through the bottom portion of the coalescing filter. A gas outlet is associated with the second housing for allowing the separated gas to exit the filter unit. The vane separator includes wall portions defining a tortuous path through which the gas flows. A reservoir can be provided in fluid communication with the first housing for receiving the separated liquid condensates. An impingement head and a tuyere can be located within the first housing where the impingement head and tuyere are positioned inline between the inlet and vane separator. The first orientation of the first housing can be substantially horizontal and the second orientation of the second housing can be substantially vertical.

These and other features and characteristics of the present invention, as well as the methods of operation and functions of the related elements of structures, and the combination of parts and economies of manufacture, will become more apparent upon consideration of the following description with reference to the accompanying drawings, all of which form a part of this specification, wherein like reference numerals designate corresponding parts in the various figures.

DESCRIPTION OF THE INVENTION

For purposes of the description hereinafter, spatial orientation terms, as used, shall relate to the referenced embodiment as it is oriented in the accompanying drawing figures or otherwise described in the following detailed description. However, it is to be understood that the embodiments described hereinafter may assume many alternative variations and configurations. It is also to be understood that the specific components, devices, and features illustrated in the accompanying drawing figures and described herein are simply exemplary and should not be considered as limiting.

Reference is now made to FIGS. 1-3, 4A, and 4B which show the horizontal coalescing filter unit, generally indicated as 10, in accordance with the invention. The coalescing filter unit includes a first or horizontal housing 20 including an inlet 22 and an outlet 24. The first or horizontal housing 20 can be positioned in a first orientation. According to one embodiment, the first orientation can be substantially horizontal. The inlet is configured for receiving a gas under pressure, shown by arrow 12. Often the gas obtained in the Marcellus/Utica industry is often referred to as a "wet gas" or "wet crude" due to the large amounts of liquid condensates (NGLs), along with water, found in the natural gas. Recent testing of the Marcellus/Utica Shale Gas plays, such as those found in Pennsylvania, show that the largest amount of NGLs has been around 7 gallons per MCF, where MCF is defined as 1,000 cubic feet. The highest levels were found in northern West Virginia, where the range was about 9 gallons per MCF. The largest hydrocarbon found in most of these samples has been ethane ($C_2H_6$), however, it can be appreciated that other NGLs such as propane ($C_3H_8$), butane ($C_4H_{10}$), and the like can be present in the gas samples. The NGLs can be separated from the gas and used in other applications, such as plastic production, petrochemical feedstocks, and the like.

Figure 1:
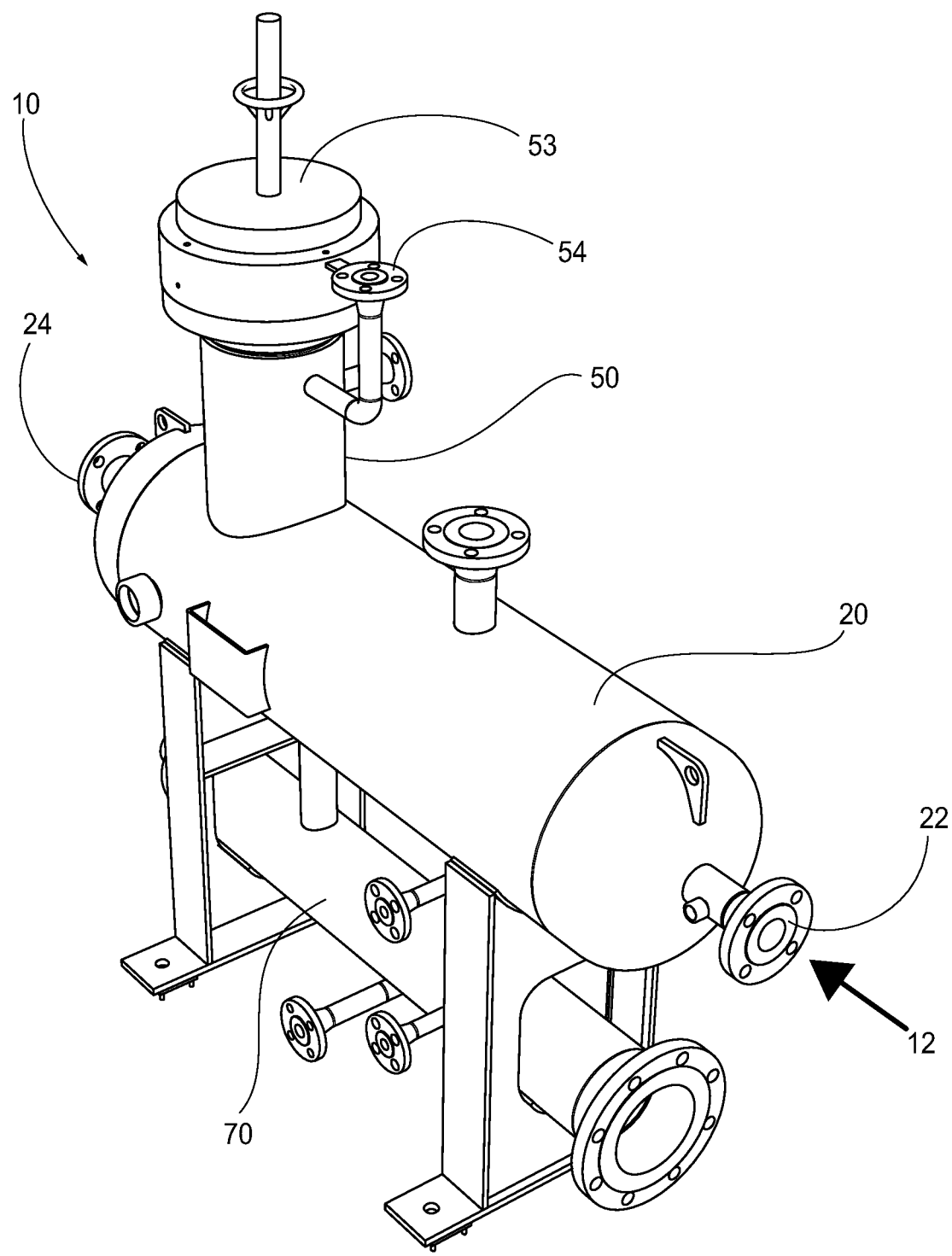
FIG. 1 is a perspective view of the horizontal coalescing filter unit in accordance with an embodiment of the invention.
Figure 2:
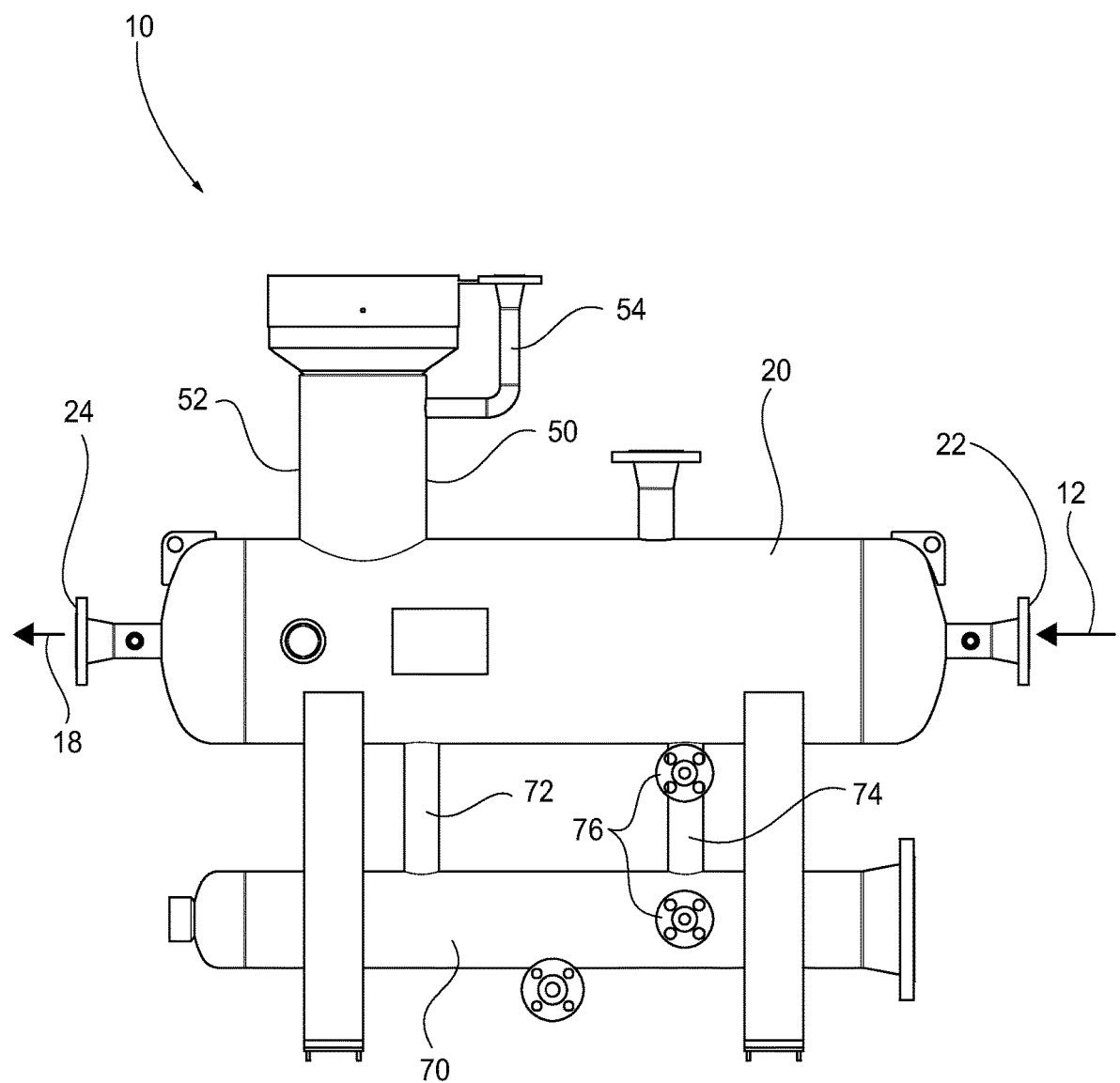
FIG. 2 is a side elevation view of the horizontal coalescing filter unit of FIG. 1, with the access cover removed, in accordance with an embodiment of the invention.
Figure 3:
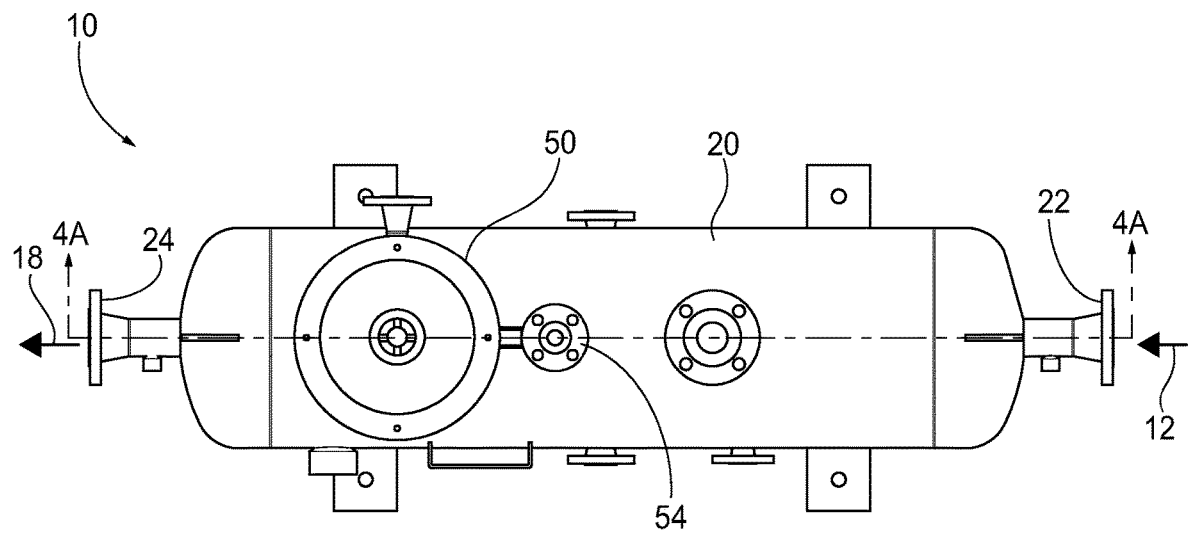
FIG. 3 is a top view of the horizontal coalescing filter unit of FIG. 2 in accordance with an embodiment of the invention.
Figure 4A:
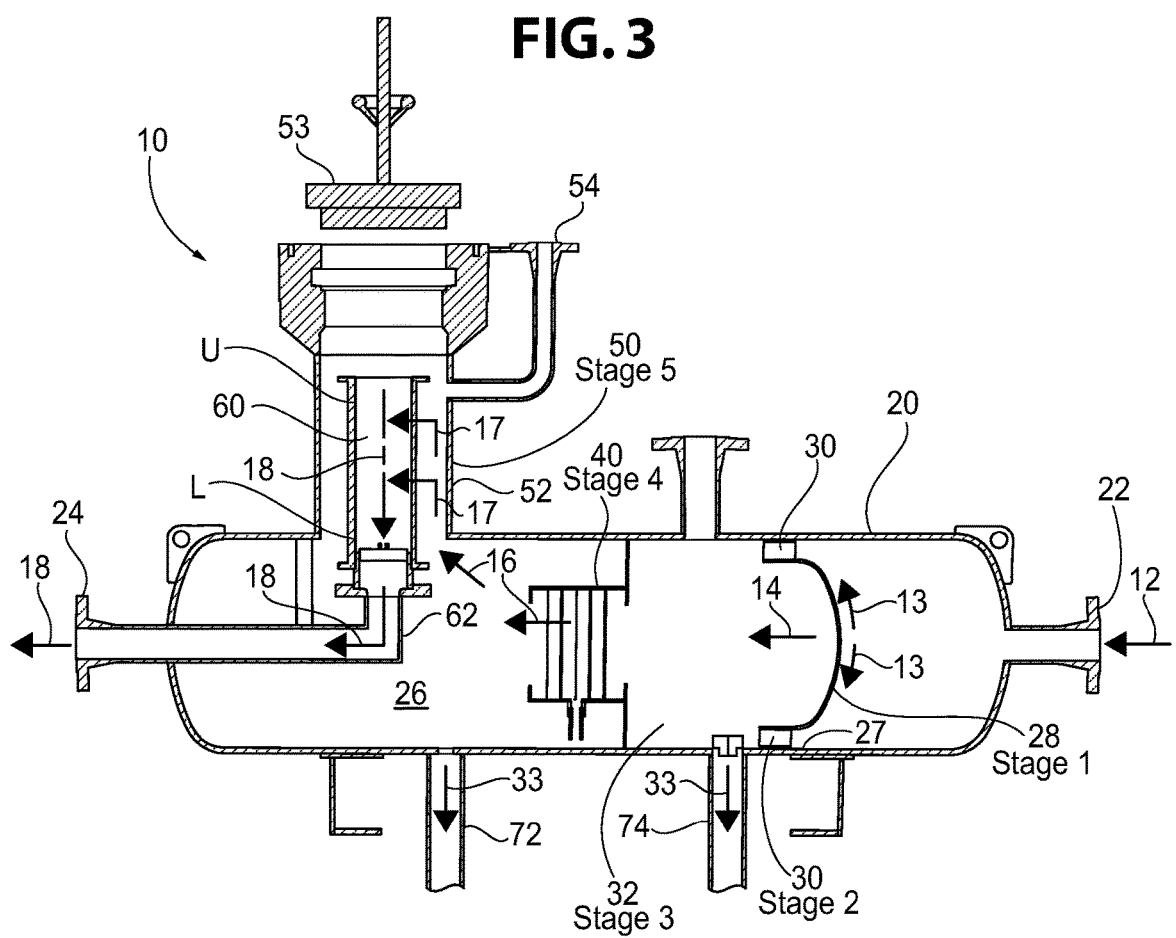
FIG. 4A is a cross-sectional view of the horizontal coalescing filter unit taken along line 4A-4A of FIG. 3 in accordance with an embodiment of the invention.
Figure 4B:
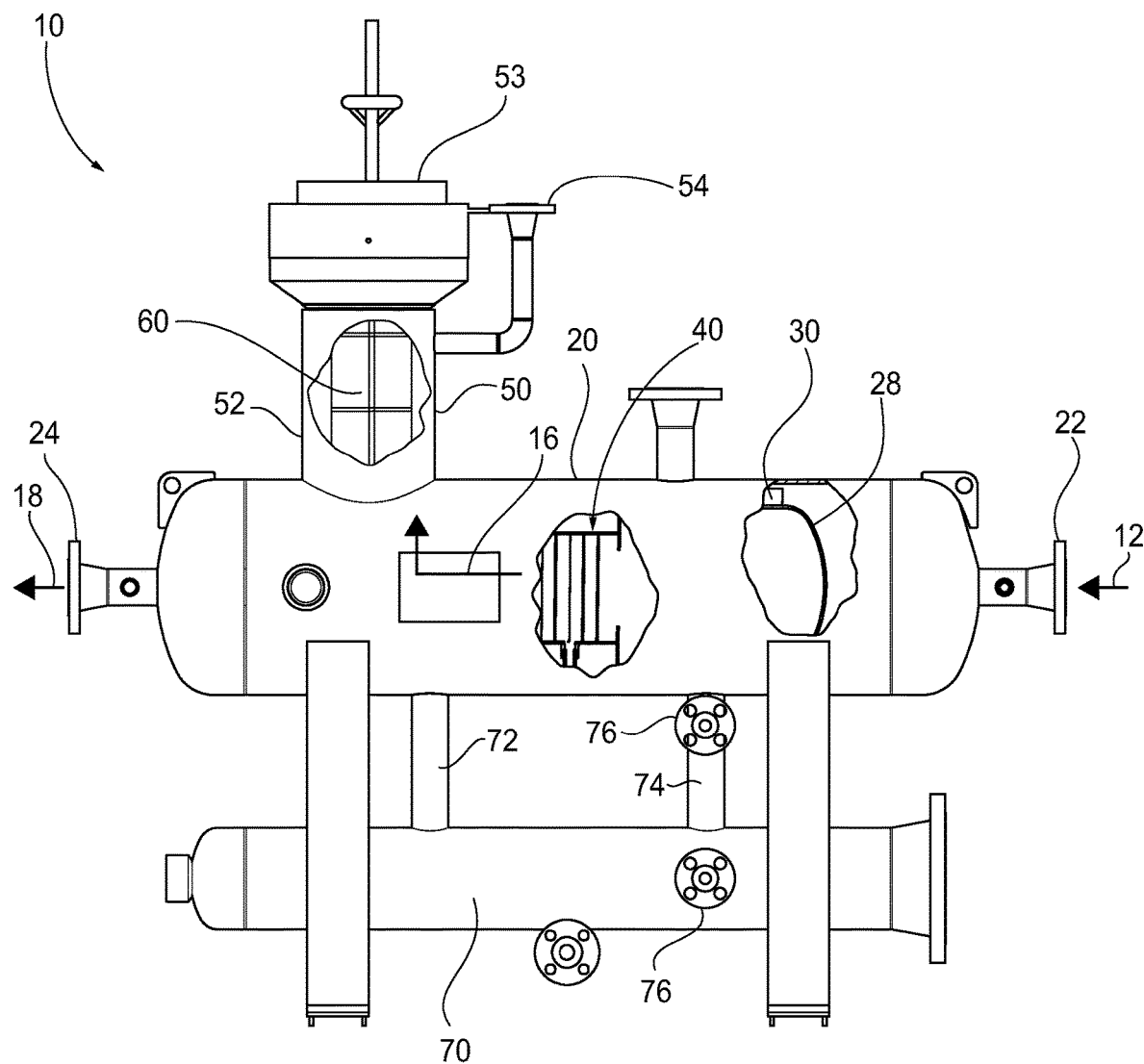
FIG. 4B is a side elevation view of the horizontal coalescing filter including cut-out portions in accordance with an embodiment of the invention.
Figure 5A:
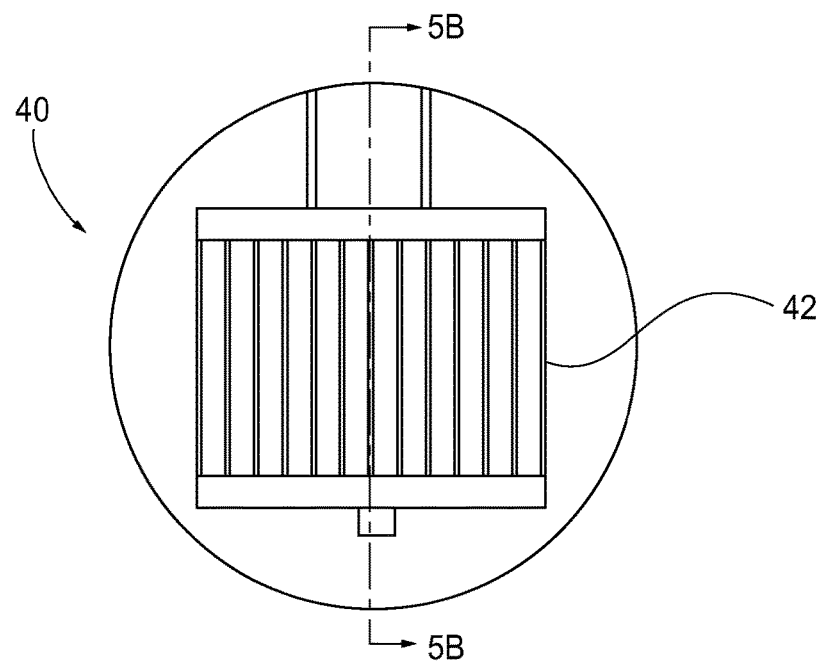
FIG. 5A is an expanded view of a vane separator for use within the horizontal coalescing filter in accordance with an embodiment of the invention.
Figure 5B:
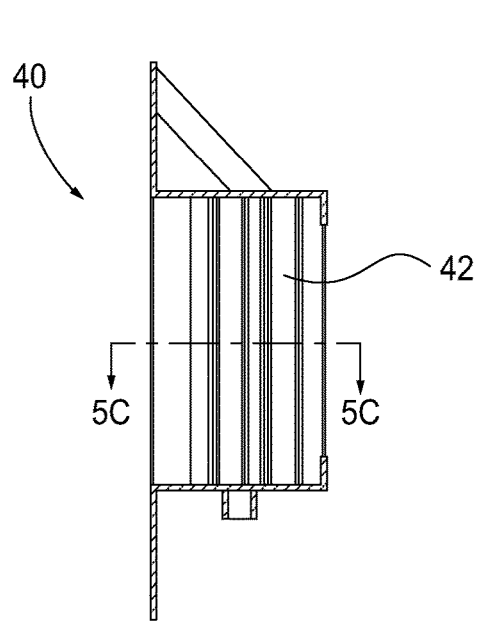
FIG. 5B is a cross-sectional view of the vane separator taken along line 5B-5B of FIG. 5A in accordance with an embodiment of the invention.
Figure 5C:
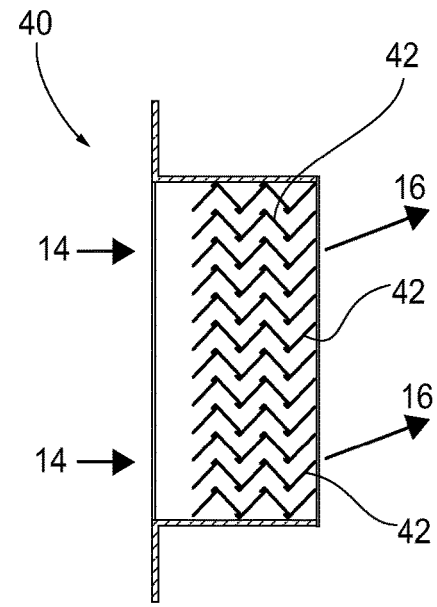
FIG. 5C is a cross-sectional view of the vane separator taken along line 5C-5C of FIG. 5B in accordance with an embodiment of the invention.
Figure 6:
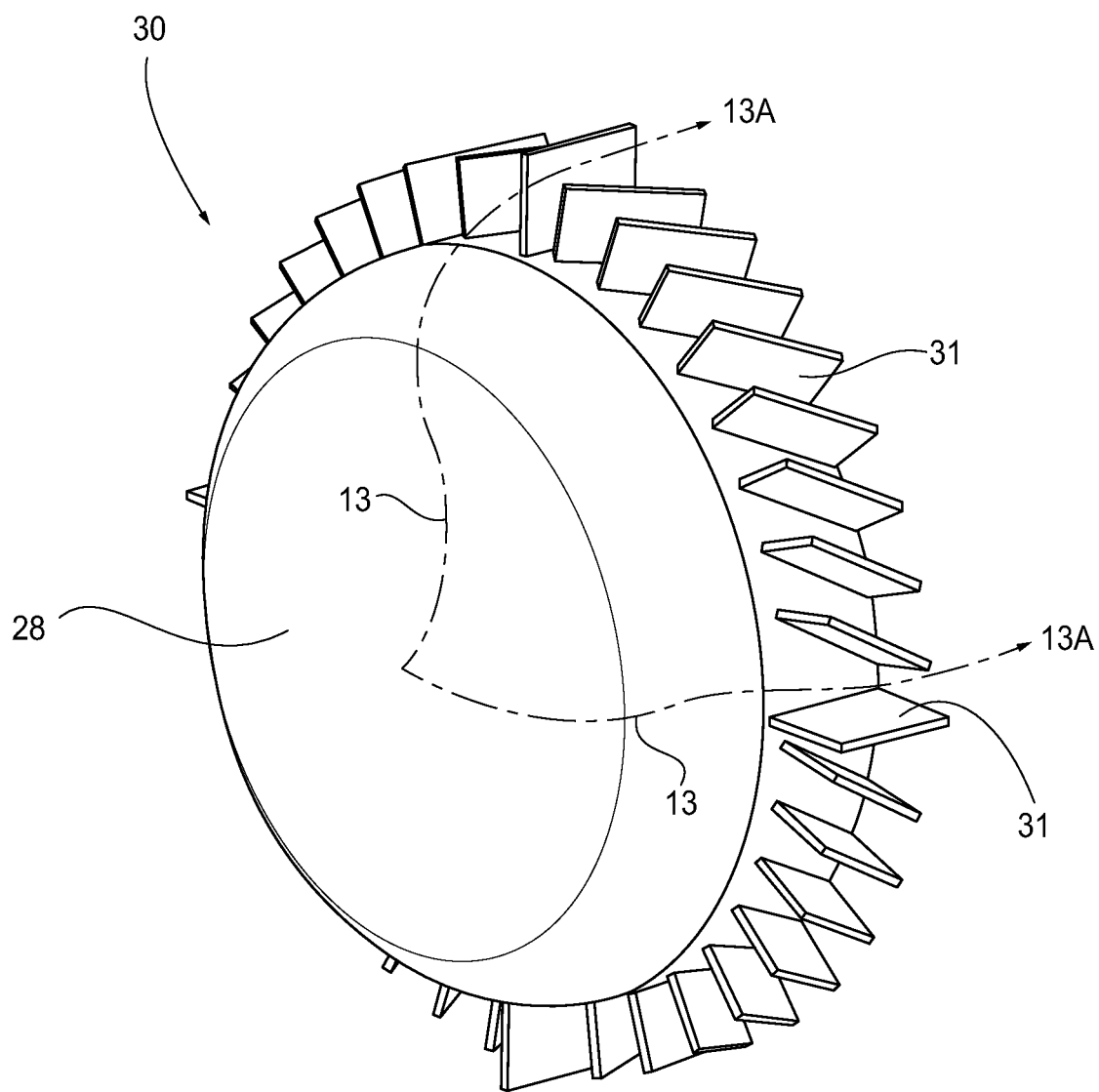
FIG. 6 is a perspective view of the tuyere for use within the horizontal coalescing filter in accordance with an embodiment of the invention.

With continuing reference to FIGS. 1-3, 4A, and 4B, the gas 12 is fed under pressure into the interior chamber 26 of housing 20 where the gas moves along a first or horizontal path and then along a second or vertical path through various stages that slow down the velocity of the gas to cause the liquids to combine into larger droplets and fall out of the flow of the gas. In the first stage, the gas 12 enters through the inlet 22 along the first or horizontal path into the interior chamber 26 of the housing at a high velocity where it comes into contact with or strikes an impingement head 28. This immediate reduction in velocity caused by the striking of the gas with the impingement head 28 causes micron-sized droplets in the gas 12 to combine into larger droplets and immediately fall out of the stream. The impingement head 28 disperses the gas stream 12 in an outwardly direction, as indicated by arrow 13, toward stage 2, which includes a circumferential tuyere or stator 30; as shown in FIG. 6, that includes a plurality of vanes 31 that direct the gas, as indicated by arrows 13a, outwardly in a centrifugal manner. This causes the larger droplets to flow down the interior wall 27 of the housing 20 to the sump area, as discussed below, where the liquid is drained off. The impingement head 28 and tuyere 30 can be inline with the inlet 22 for agitating and moving the gas, as indicated by arrow 14 in FIG. 4A, in a horizontal direction through the housing 20. In stage 3, referenced by numeral 32, the gas flow 14 continues to move through the housing 20 in a first or horizontal direction where the velocity is slowed to the point where droplets will naturally fall out of the flow of the gas. This is accomplished by calculating the vapor velocity per API Specification 12J where gravity is sufficient enough to pull droplets from a given flow. The size of the vessel housing 20 is calculated and designed so that the formed droplets would naturally fall out of the gas stream 14. The gas stream 14 is then directed to stage 4 which includes a vane separator 40 located within the chamber 26 of the horizontal housing 20 and positioned inline with the inlet 22 and the tuyere 30. It can be appreciated that more than one vane separator 40 can be located within the housing 20. The vane separator 40 is configured for further removing the liquid condensates from the gas, as shown by arrow 16. With reference to FIGS. 5A-5C, the vane separator 40 can include wall portions 42 defining a tortuous path through which the gas 14 flows. The vane separator 40 can be designed to be 99% efficient and can remove the liquid condensates down to approximately 10 microns. According to one embodiment, the vane separator 40 can be made from 316 Stainless Steel and the design of the vane separator 40 makes it essentially self-cleaning.

In stage 5, the gas stream 16 enters into the final point of separation where it is fed in a second or vertical direction into a second or vertical housing 50 that is in fluid communication with the first or horizontal housing 20. The second housing can be positioned in a second orientation that is different than the first orientation of the first housing 20. In accordance with one embodiment, the second orientation can be a substantially vertical orientation. The vertical housing includes a wall portion 52 and a vent 54 associated with the wall portion 52. According to one embodiment, the vertical housing 50 can employ a closure 53, such as disclosed in U.S. Pat. No. 7,332,010 and/or 7,850,751, both of which are owned by TM Industrial Supply, Inc., and wherein the entirety of the disclosures of these patents being hereby incorporated by reference. One or more vertical coalescing filters 60, one of which is shown in FIG. 4B, are located within the vertical housing 50. The almost dry gas 16 exiting from the vane separator 40 is directed to flow into the vertical coalescing filter 60, which can be a pleated filter where the gas is caused to flow from an exterior of the filter to a hollow interior of the filter, as indicated by arrows 17, for further removal of the liquid condensates from the gas. According to one embodiment, the coalescing filter 60 can be a Gas Flow Membrane (GFM), such as described in aforementioned U.S. Pat. No. 7,332,010, and/or can be a system which utilizes GFM Technology® owned by TM Industrial Supply, Inc. These coalescing filters 60 will handle the final filtration. According to one embodiment, liquid removal 99.99% of 0.3 micron and larger particles and solid removal 99.995% of 0.3 micron and larger particles can be achieved. The clean, dry gas, as shown by arrow 18, then exits out the bottom portion of the filter 60 and is directed out of the housing 20 via tubular member 62 and gas outlet 24. It can be appreciated that, in addition to the liquid condensates, the vane separator 40 and/or gas coalescing chamber 60 can remove any solids which are located within the gas. These vertically positioned filters 60 allow the liquid droplets to fall out of the natural gas flow cleanly, thus, eliminating the possibility of liquids being re-entrained into the natural gas flow. Also, utilizing coalescing filters in the vertical position allows the formed droplets to fall directly down into the sump area without any possible chance of carryover.

A reservoir 70 is provided in fluid communication with the horizontal housing 20 for receiving the separated liquid condensates, as indicated by arrow 33, via the sump area that includes a series of drains, pipes, and/or valves 72, 74, 76. The reservoir 70 can be filled via gravity.

The filter unit 10 of the present invention can have an overall height of approximately 72" or less, which is significantly less than gas coalescing chambers and/or gas separating chambers currently in use. However, it can be appreciated that the filter unit 10 can exceed 72" depending on the size of the horizontal gas coalescing filter.

With continuing reference to FIGS. 1-3, 4A, and 4B, a method for filtering liquid condensates from a gas under pressure wherein the gas moves through various stages includes providing a first or horizontal housing 20 including an inlet 22 and an outlet 24 wherein the inlet 22 is configured for receiving the gas 12 under pressure moving along a first or horizontal path. An impingement head 28 and a circumferential tuyere 30, as shown in FIG. 6, can be provided within the interior chamber 26 of the housing. In a first stage, the gas strikes the impingement head 28 causing some of the liquid condensates to drop out and then redirects the gas stream into an outwardly direction as indicated by 13. In a second stage, the gas moves to the tuyere 30 which includes vanes 31 that force the gas outwardly in a centrifugal manner, as indicated by arrows 13a. This causes the larger droplets to flow down the interior wall 27 of the housing 20 to the sump area. The gas stream 14 then moves in a horizontal direction through the chamber at stage 3, where slowing velocity of the stream 14 causes some of the droplets to naturally fall out of the flow of the gas. The method further includes directing the gas to stage 4 that includes a vane separator 40 located within the horizontal housing 20 inline with the inlet 22. The vane separator 40 can include wall portions 42 defining a tortuous path which facilitates further removal of the liquid condensates from the gas down to approximately 10 microns. The gas 16 exiting the vane separator 40 is then directed to stage which includes a second or vertical housing 50, which is in fluid communication with the horizontal housing 20. One or more vertical coalescing filters 60 are provided in the vertical housing 50 for further removing the liquid condensates from the gas 16. The filtered gas 18 then exits the coalescing filter 60 via gas outlet 24. As stated above, the coalescing filter 60 can be a pleated filter and can employ an exterior to interior flow of the gas as indicated by arrows 17 and discussed in detail above. A fluid collecting reservoir 70 can be located beneath the horizontal housing 20 in fluid communication with the horizontal housing for receiving the separated liquid condensates via gravity through a series of pipes, valves, and/or tubing 72, 74, 76.

According to one embodiment, a first or lower portion L of the coalescing filter 60 can be contained within the horizontal chamber 26. A second or upper portion U can extend vertically away from chamber 26. Some of the advantages achieved by this is that when the filter 60 becomes wet and the liquid is pulled down to the bottom of the filter 60 to drip downward towards the reservoir 70, there is no upward gas flow that could pick the smaller droplets back up and re-saturate the filter 60. If the filter 60 was completely contained within the vertical housing 50 then that possibility exists. This also allows for a slower gas 16 velocity around the filter 60 since the filter 60 is not solely contained within the vertical housing 50.

While embodiments of the horizontal gas coalescing filter unit are provided in the foregoing description, those skilled in the art may make modifications and alterations to these embodiments without departing from the scope and spirit of the invention. Accordingly, the foregoing description is intended to be illustrative rather than restrictive.

The invention claimed is:

1. A gas coalescing filter unit for removing liquid from gas comprising:
   a first housing positioned in a substantially horizontal orientation and including an inlet and an outlet, said inlet configured for receiving a gas under pressure;
   an impingement head located within the first housing and positioned inline with the inlet;
   a plurality of vanes positioned subsequent to the impingement head, wherein the plurality of vanes are configured to force the gas outwardly in a centrifugal manner;
   a vane separator located within the first housing and positioned inline with the inlet and the impingement head, said vane separator configured for removing liquid condensates from the gas, wherein the impingement head is located between the inlet and the vane separator and the plurality of vanes are positioned between the impingement head and the vane separator;
   a second housing in fluid communication with the first housing, said second housing positioned in a substantially vertical orientation;
   a coalescing filter located within the second housing for receiving the gas exiting the vane separator and for further removing the liquid condensates from the gas; and
   a gas outlet associated with the second housing for allowing separated gas to exit the filter unit, wherein a lower portion of the coalescing filter is contained within the first housing.

2. The filter unit of claim 1, wherein the vane separator includes wall portions defining a tortuous path through which the gas flows.

3. The filter unit of claim 1, including a reservoir in fluid communication with the first housing for receiving separated liquid condensates.

4. The filter unit of claim 1, wherein the coalescing filter located within the second housing comprises a pleated filter and wherein the coalescing filter located within the second housing is configured to cause the gas to flow from an exterior of the pleated filter to a hollow interior of the pleated filter and wherein any liquid condensates separated out of the gas by the pleated filter flow out of a portion of the coalescing filter.

5. The filter unit of claim 1, wherein the unit has an overall height of approximately 72" or less.

6. A method for filtering liquid from a gas under pressure comprising:
   (a) providing a gas coalescing filter unit having:
      (i) a first housing positioned in a substantially horizontal orientation and including an inlet and an outlet, said inlet configured for receiving the gas under pressure;
      (ii) an impingement head located within the first housing and positioned inline with the inlet;
      (iii) a plurality of vanes positioned subsequent to the impingement head, wherein the plurality of vanes are configured to force the gas outwardly in a centrifugal manner;
      (iv) a vane separator located within the first housing and positioned inline with the inlet and the impingement head, said vane separator configured for removing liquid condensates from the gas, wherein the impingement head is located between the inlet and the vane separator and the plurality of vanes are positioned between the impingement head and the vane separator;
      (v) a second housing in fluid communication with the horizontal housing, said second housing positioned in a substantially vertical orientation;
      (vi) a coalescing filter located within the second housing for receiving the gas exiting the vane separator and for further removing the liquid condensates from the gas; and
      (vii) a gas outlet associated with the second housing for allowing the separated gas to exit the filter unit;
   (b) supplying the gas under pressure into the inlet of the first housing; and
   (c) collecting separated gas from the gas outlet associated with the second housing, wherein a lower portion of the coalescing filter is contained within the first housing.

7. The method of claim 6, wherein the vane separator includes wall portions defining a tortuous path through which the gas flows.

8. The method of claim 6, wherein the filter unit includes a reservoir in fluid communication with the first housing for receiving separated liquid condensates.

9. The method of claim 6, wherein the coalescing filter located within the second housing comprises a pleated filter and wherein the coalescing filter is configured to cause the gas to flow from an exterior of the pleated filter to a hollow interior of the pleated filter and wherein the coalescing filter is configured such that any liquid condensates separated out of the gas by the pleated filter flow out of a bottom portion of the coalescing filter.

10. The method of claim 6, wherein the filter unit is designed to have an overall height of approximately 72" or less.

11. The filter unit of claim 1, wherein the second housing is located downstream and separate from the vane separator.

12. The filter unit of claim 1, wherein the filter unit includes five separation phases.

* * * * *